United States Patent
Warren

[11] Patent Number: 6,058,554
[45] Date of Patent: May 9, 2000

[54] HEATED WINDSHIELD WIPER BLADE

[76] Inventor: Jeffery Warren, 34160 Ecorse Rd., Romulus, Mich. 48174

[21] Appl. No.: 09/176,875

[22] Filed: Oct. 22, 1998

[51] Int. Cl.⁷ ...................................................... B60S 1/38
[52] U.S. Cl. ........................................ 15/250.06; 219/202
[58] Field of Search ........................ 15/250.06, 250.05, 15/250.07, 250.08, 250.09, 250.48; 219/202, 203

[56] References Cited

U.S. PATENT DOCUMENTS

| | | | |
|---|---|---|---|
| 2,755,499 | 7/1956 | Mays | 15/250.06 |
| 5,221,828 | 6/1993 | Basheer et al. | 219/202 |
| 5,488,752 | 2/1996 | Randolph | 15/250.06 |
| 5,504,965 | 4/1996 | Guell | 15/250.06 |
| 5,572,765 | 11/1996 | Guell | 15/250.06 |
| 5,603,856 | 2/1997 | Bischoff | 219/202 |
| 5,632,058 | 5/1997 | Stanak | 15/250.04 |
| 5,649,337 | 7/1997 | Lobner | 15/250.06 |
| 5,787,543 | 8/1998 | Selders | 15/250.06 |
| 5,831,242 | 11/1998 | Gallagher | 15/250.06 |

*Primary Examiner*—Gary K. Graham
*Attorney, Agent, or Firm*—Joseph N. Breaux

[57] ABSTRACT

A heated windshield wiper blade system which includes a gel filled core which extends the length of the windshield wiper blade and which gel filled core includes material which is both heat conducting and electrically conducting while a electrical conductor extends the length of the gel filled core so that when electrical current is supplied to the electrical conductor and when the gel filled core is grounded to the vehicle's body, the gel filled core heats thereby heating the entire windshield wiper blade. The heating system is controlled by an on/off switch located on the vehicle's dashboard while a voltage regulator controls voltage and the heat level of the gel filled core.

5 Claims, 2 Drawing Sheets

HEATED WINDSHIELD WIPER BLADE

TECHNICAL FIELD

The present invention relates to devices and methods for windshield wiper blades and more particularly to devices and methods for heated windshield wiper blades which include a gel core extending the length of the rubber windshield wiper blades. The gel core is heated with using a conducting wire running through the center of the gel and which is electrically conducted with the gel material and wherein the gel material provides high heat conductive and electrically conductive properties providing a means for heating the windshield wiper blade effectively.

BACKGROUND ART

Freezing windshield wiper blades are not only inconvenient but pose a safety hazard to drivers. The usual methods of removing ice from windshield wiper blades is to stop a vehicle and shake or knock the ice off the windshield wipers. During severe weather this must be done quite often. Heated windshield wipers have been developed which include devices with heating elements extending the length of the windshield wiper blade, heating elements positioned within the core of the windshield wiper blade and other arrangements. These prior art devices are useful for their stated purposes however, given the non heat conductive properties of rubber, these prior art devices do not effectively heat all portions of a rubber windshield wiper blade. The present invention utilizes the increased heat conductive properties of a gel material which comprises an interior core of the windshield wiper blade. The gel core provides not only heat conductive properties to transport heat to a larger area of the rubber wiper blade, but also electrical conductive properties to enable the windshield heating system to function with a conductive wire running through the gel core. The conductive wire extends through the gel in electrical contact with the gel which thereby heats the gel and the entire windshield wiper blade.

Prior art patent which are relevant are as follows:

Lobner, U.S. Pat. No. 5,649,337 discloses a heated windshield wiper blade with an electrically heated wire extending the length internally within the windshield wiper blade. This device is useful for its stated purposes however, as mentioned above the heating element does effectively heat all portions of the rubber windshield wiper blade given the non heat conductive properties of rubber. The present invention provides a gel core with excellent heat conductive properties providing a means for transmitting heat from the heating element to broader areas of the windshield wiper blade.

Stanak, U.S. Pat. No. 5,632,058 discloses a heated windshield wiper blade with an interior heating element.

Bischoff, U.S. Pat. No. 5,603,856 discloses an electrically heated windshield wiper with enclosed flexible shroud.

Guell, U.S. Pat. No. 5,572,765 discloses a heated wiper blade and blade carrier employing a single heating element.

Guell, U.S. Pat. No. 5,504,965 discloses an electrically heated wiper blade utilizing spiral coiled resister wire.

Randolph, U.S. Pat. No. 5,488,752 discloses a heat conducting apparatus for wiper blades.

Basheer, et al, U.S. Pat. No. 5,221,828 discloses a heated wiper blade using conductive elastomer.

As can be seen from the prior art there has never been an invention as the present which includes a gel filled core extending the length of the windshield wiper blade which provides superior heat conductive properties and electrical conductive properties therein. The gel provides a means for effective heating the entire windshield wiper blade allowing the blade to operate smoothly in cold weather and also preventing ice buildup during severe weather. The gel also provides a means for creating a heating system in each wiper blade wherein a conductive electrical wire, which extends the length of the wiper blade, electrically contacts the gel and heats the gel therein.

GENERAL SUMMARY DISCUSSION OF INVENTION

It is thus an object of the invention to provide a Heated Windshield Wiper Blade that prevents ice buildup on the windshield wiper blade during severe weather and also provides a heated windshield wiper blade that remains pliable in extremely cold weather so that the windshield wiper blades operate effectively and smoothly across the entire windshield in extreme cold weather.

It is a further object of the invention to provide a Heated Windshield Wiper Blade that utilizes a gel filled core in the center of the windshield wiper blade and extending the length of the windshield wiper blade while a conductive wire is placed through the gel material and provides a means of electrically heating the gel and the wiper blade.

It is a still further object of the invention to provide a Heated Windshield Wiper Blade that includes a gel filled core which is electrically conducting material while a conductive wire runs through the center of the gel and provides an electrical current for heating the gel filled core while an on/off switch is located on the interior of the vehicle and electrical power is supplied by the vehicle via electrical wiring extending to the windshield wiper arms of the vehicle.

Accordingly, a Heated Windshield Wiper Blade is provided that prevents ice buildup on windshield wiper blades and which includes a windshield wiper blade that remains pliable in extreme weather conditions wherein the windshield wiper blade includes a gel filled core which extends the length of the windshield wiper blade and which gel filled core includes material which is both heat conducting and electrically conducting while an electrical conducting wire is placed in the gel filled core and provides a means for electrically heating the gel and the windshield wiper blade thereon. The system also includes an operating switch and wiring placed within the vehicle.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

It can be seen from the following description that in use an automobile owner would substitute his/her standard windshield blades with the heated windshield wiper blades described herein. Once installed, the user may activate the heating elements in the windshield wiper blades by switching the dashboard control switch to the "on" position. This action causes electrical current to run through a conducting wire extending through a gel filled core through the length of the windshield wiper blades. The windshield wiper blades are filled with an electrically conducting and heat conducting gel. The electrical current in the conducting wire is grounded by the gel material resulting in increased heat in the gel area thereby heating the length of the windshield wiper blade. Use of the heated windshield wiper blades provides the vehicle owner with the capability to melt ice or snow from the windshield wiper blades and also to assure that the windshield wiper blade rubber material remains pliable during extremely cold temperatures.

Figure 1:
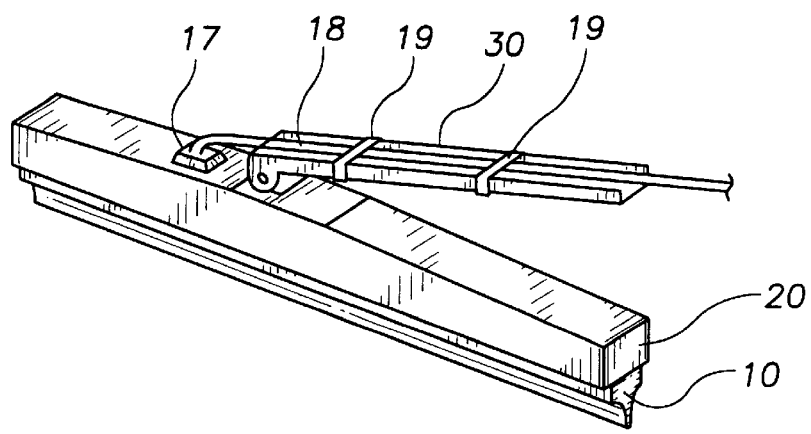
FIG. 1 is an isometric view of a windshield wiper blade mounted to a windshield wiper arm with the electrical wiring extending to a back portion of the windshield wiper blade.
Figure 2:
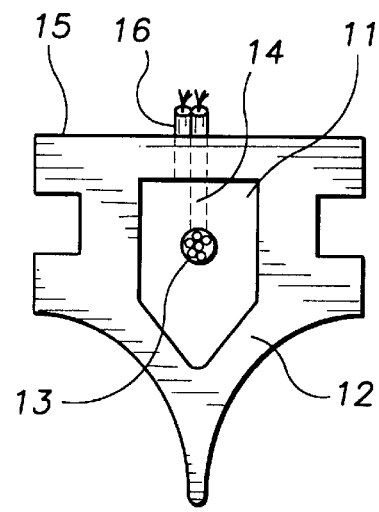
FIG. 2 is a cross section of a rubber windshield wiper blade with an irregular shaped gel filled core with an electrically conducted wire inserted therein.
Figure 3:
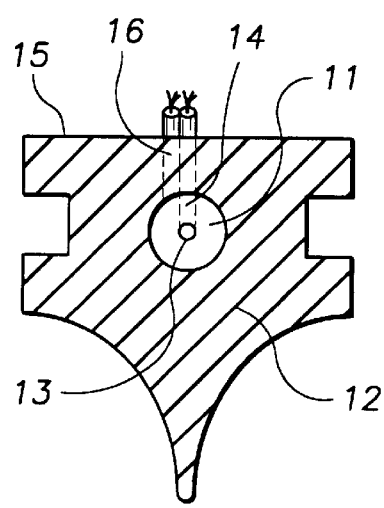
FIG. 3 is a cross section of a rubber windshield wiper blade with a round gel filled core with an electrically conducted wire inserted therein.
Figure 4:
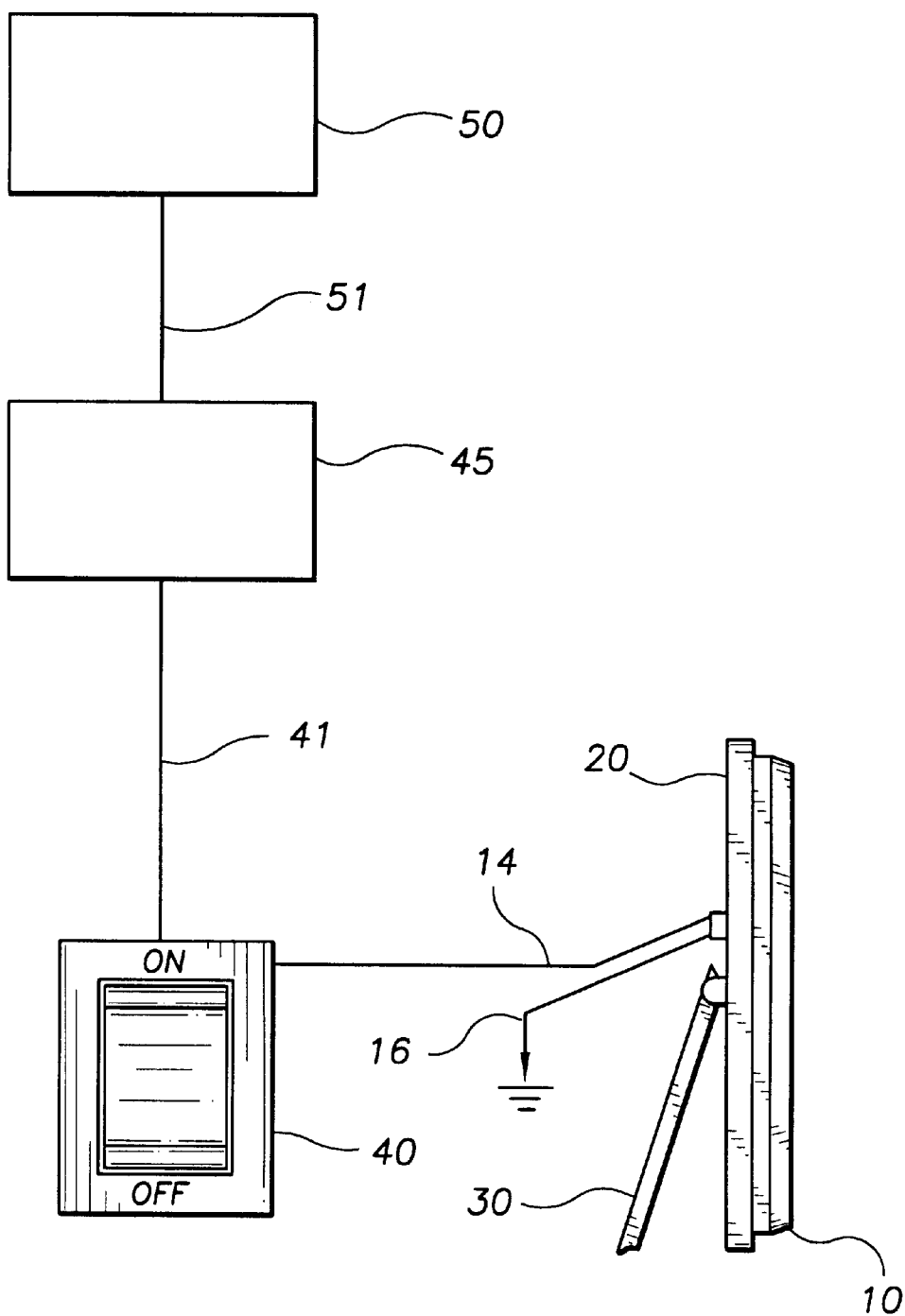
FIG. 4 is an electrical schematic of the component parts of the heated windshield wiper blade system.

Referring to the figures in detail, FIG. 1 illustrates the heated windshield wiper blade 10 installed on a windshield wiper blade frame 20 and connected to a conventional windshield wiper arm 30. The windshield wiper blade includes an interior gel filled core 11. The gel filled core is illustrated in detail in FIGS. 2 and 3. In FIG. 3 the gel filled core is substantially circular in dimension while the gel filled core in FIG. 2 is irregular shaped. The shape of the gel filled core preferably includes a high surface area in contact with rubber material 12 comprising the bulk of the windshield wiper blade material. It is well known that rubber which comprises normal windshield wiper blades is a relatively poor heat conductor and also nonelectrically conducting. The non heat conducting properties of the conventional wiper rubber makes heating the entire windshield wiper blade very difficult. The purpose of the irregular shaped gel filled core is to contact as much interior surface of the rubber windshield wiper blade as possible to assure that the windshield wiper blade is effectively heated. FIG. 2 illustrates the preferable gel filled core irregular shape which leads to maximum area contact with the heated gel. The gel filled core 11 also extends the entire length of the windshield wiper blade however the ends of the windshield wiper blade are capped preventing the gel from being exposed on the ends. Formulation of the rubber composition 12 which comprises the majority of the windshield wiper blade is accomplished using known rubber compounding. The gel formulation must be suitable for conducting an electrical current while also preferably including a heat conductivity greater than the rubber component 12. Additionally, the prior art Basheer, U.S. Pat. No. 5,221,828 describes elastomers for use with windshield wiper blades and which elastomer includes an electrical conductivity which decreases as temperature increases. The elastomers described in Basheer may be suitable for filling the gel core for the present invention. Other gels known by those skilled in the art may be adapted and used in the gel core as long as the gel used provides both increased heat conductivity and electrical conductivity. A conducting wire 13 extends through the center of the gel filled core. The electrical conducting wire 13 is an electrical lead 14 extending to a back surface 15 of the windshield wiper blade. A ground electrical conductor 16 extends from the gel filled core to the back surface of the wiper blade. The ground electrical lead 16 provides an electrical connection from the electrically conducting gel material to the vehicle ground thereby completing the electrical circuit contained within the heated windshield wiper blade. The two electrical leads 14 and 16 are contained within a snap-on connector 17 which is connected to an end of electrical wiring harness 18 which is securely strapped to the windshield wiper arm 30 utilizing retention clips 19. The connecting plug 17 allows the windshield wiper blade to be removed easily by disconnecting the wires when pulling the plug from the back of the windshield wiper blade FIG. 4 illustrates the electrical circuitry including the on/off switch 40, voltage regulator 45 and electrical supply 50. The on/off switch is preferably located on the interior of the vehicle in a handy location on the vehicle dashboard. The ground lead 16 extends from the back portion of the windshield wiper blade and is connected to any portion of the vehicle's body which is in electrical connection with the vehicle's common ground. Electrical lead 14 extends from the back of the windshield wiper blade to the on/off switch. While the on/off switch is energized by electrical lead 41 which extends from the voltage regulator to the on/off switch. Electrical power supply 50 includes a preferably 20 amp fused circuit with a power lead 51 extending to the voltage regulator 45.

When in use, the user would simply switch the on/off switch 40 to the on position which would send an electrical current through lead 14 to the conducting wire 13 which extends through the center of the gel filled core. The electrical lead 13 is in electrical contact with the vehicle's ground through electrical lead 16. As a result of this grounding, the gel will heat and heat the surrounding rubber comprising the windshield wiper blade. A thermistor may be employed for controlling the temperature of the gel filled core and would be utilized by placing the thermistor in the gel filled core and running an additional electrical lead from the gel filled core to the voltage regulator. The user would then control the voltage and the gel filled core temperature.

It is noted that the embodiment of the Heated Windshield Wiper Blade described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A heated windshield wiper blade for use on a vehicle, comprising:

a) windshield wiper blade with an elongated core extending the length of the wiper blade which elongated core is capped at ends of the wiper blade and which elongated core is filled with a gel material which has a higher heat conductivity than material comprising the wiper blade, the gel material includes an electrically conducting material while the material comprising the wiper blade is not electrically conductive, an electrical lead in electrical contact with the gel material and extending from the gel material to a common ground on the vehicle, b) an electrically conductive wire extending the length of the core and placed within the core in contact with the gel material, c) a power supply with an on/off switch in line with an electrical lead which is in electrical contact with the electrically conductive wire so that when power is supplied to the electrically conductive wire electrical current flows through the gel material seeking the common ground thereby heating the gel and the surrounding material comprising the wiper blade thereby heating the wiper blade.

2. The heated windshield wiper blade of claim 1, wherein the windshield wiper blade further comprises; a quick disconnect electrical connected positioned on a back of the windshield wiper blade and which provides an electrical connector for the electrical lead to the common ground and the electrical lead connecting the conductive wire so that the wiper blade may be electrically disconnected prior to removing the wiper blade from a wiper arm.

3. The heated windshield wiper blade of claim 1, wherein the electrical leads extending from the wiper blade are secured to a wiper arm with wire retention clips.

4. The heated windshield wiper blade of claim 1 further comprising a thermistor contained within the core and in contact with the gel material and which supplies variable resistance to a voltage regulator in line with the power supply thereby controlling the temperature of the gel filled core and the windshield wiper blade.

5. The heated windshield wiper bade of claim 1 wherein the power supply further comprises a regulator for varying the voltage to the electrically conductive wire in the gel material so that a user may alter the temperature of the heated wiper blade.

* * * * *